(12) United States Patent
Albrecht et al.

(10) Patent No.: US 7,675,703 B2
(45) Date of Patent: Mar. 9, 2010

(54) MAGNETIC RECORDING DISK DRIVE WITH PATTERNED MEDIA AND SYSTEM FOR CLOCKING WRITE DATA

(75) Inventors: Thomas R. Albrecht, San Jose, CA (US); David Timothy Flynn, Mantorville, MN (US); Richard Leo Galbraith, Rochester, MN (US); Michael Anthony Moser, San Jose, CA (US); Bruce Alexander Wilson, San Jose, CA (US); Xiao Z. Wu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 320 days.

(21) Appl. No.: 11/759,959

(22) Filed: Jun. 8, 2007

(65) Prior Publication Data

US 2008/0304173 A1 Dec. 11, 2008

(51) Int. Cl.
*G11B 5/09* (2006.01)
(52) U.S. Cl. ...................................... 360/51
(58) Field of Classification Search ................ 360/75, 360/51, 60, 31, 77.08
See application file for complete search history.

(56) References Cited

U.S. PATENT DOCUMENTS

| | | | | |
|---|---|---|---|---|
| 5,442,172 A | * | 8/1995 | Chiang et al. | 250/237 G |
| 5,535,067 A | | 7/1996 | Rooke | |
| 5,820,769 A | | 10/1998 | Chou | |
| 5,909,333 A | * | 6/1999 | Best et al. | 360/51 |
| 6,496,076 B1 | * | 12/2002 | Shoji et al. | 331/25 |
| 6,738,207 B1 | | 5/2004 | Belser et al. | |
| 6,754,017 B2 | | 6/2004 | Rettner et al. | |
| 6,977,879 B1 | * | 12/2005 | Hamada et al. | 369/53.34 |
| 7,088,534 B2 | * | 8/2006 | Sutardja | 360/51 |
| 7,113,555 B2 | * | 9/2006 | Campello de Souza et al. | 375/341 |
| 7,133,229 B2 | * | 11/2006 | Semba | 360/51 |
| 7,177,105 B1 | * | 2/2007 | Sutardja | 360/51 |
| 2006/0092541 A1 | | 5/2006 | Moser | |
| 2007/0008643 A1 | * | 1/2007 | Brady et al. | 360/75 |

OTHER PUBLICATIONS

Richter et al. "Recording potential of bit-patterned media", Appl. Phys. Lett. 88, 222512 (2006).

(Continued)

*Primary Examiner*—Fred Tzeng
(74) *Attorney, Agent, or Firm*—Thomas R. Berthold

(57) ABSTRACT

A system and method accurately clocks write data to the discrete data blocks in a patterned media disk drive. The precise time intervals between successive timing marks in the data tracks are measured by a timing mark detector that counts the integer number of write clock cycles between successive timing marks and the fractional part of a write clock cycle by detecting the phase difference between a timing mark and a reference signal. The resulting timing error is output to a write clock compensator. The write clock is capable of generating equally spaced primary phases and phases intermediate the primary phases. The compensator includes a phase rotator that controls which write clock phase is selected for output. The value in a phase register of the compensator is used to control the phase rotator to advance or retard the write clock phase, and thus to adjust its frequency and phase so as to be synchronized for writing to the data blocks.

15 Claims, 9 Drawing Sheets

OTHER PUBLICATIONS

R. L. White et al., "Patterned Media: A Viable Route to 50 Gbit/in2 and Up for Magnetic Recording?", IEEE Transactions on Magnetics, vol. 33, No. 1, Jan. 1997, pp. 990-995.

Moritz et al., "Patterned Media Made From Pre-Etched Wafers: A Promising Route Toward Ultrahigh-Density Magnetic Recording", IEEE Transactions on Magnetics, vol. 38, No. 4, Jul. 2002, pp. 1731-1736.

* cited by examiner

MAGNETIC RECORDING DISK DRIVE WITH PATTERNED MEDIA AND SYSTEM FOR CLOCKING WRITE DATA

BACKGROUND OF THE INVENTION

1. Field of the Invention

This invention relates generally to magnetic recording disk drives for use with patterned media, wherein each data bit is stored in a magnetically isolated block or island on the disk, and more particularly to such a disk drive with an improved clock for writing the data.

2. Description of the Related Art

Magnetic recording hard disk drives with patterned magnetic recording media have been proposed to increase the data density. In patterned media, the magnetic material on the disk is patterned into small isolated data blocks or islands arranged in concentric data tracks. Each island contains a single magnetic "bit" and is separated from neighboring islands by a nonmagnetic region. This is in contrast to conventional continuous media wherein a single "bit" is composed of multiple weakly-coupled neighboring magnetic grains that form a single magnetic domain and the bits are physically adjacent to one another. Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer. To produce the required magnetic isolation of the patterned blocks, the magnetic moment of the regions between the blocks must be destroyed or substantially reduced so as to render these regions essentially nonmagnetic. Alternatively, the media may be fabricated so that that there is no magnetic material in the regions between the blocks. U.S. Pat. No. 5,820,769 is representative of various types of patterned media and their methods of fabrication. A description of magnetic recording systems with patterned media and their associated challenges is presented by R. L. White et al., "Patterned Media: A Viable Route to 50 Gbit/in$^2$ and Up for Magnetic Recording?", *IEEE Transactions on Magnetics*, Vol. 33, No. 1, January 1997, pp. 990-995.

In one type of patterned media, the data islands are elevated, spaced-apart pillars that extend above the disk substrate surface to define troughs or trenches on the substrate surface between the pillars. This type of patterned media is of interest because substrates with the pre-etched pattern of pillars and trenches can be produced with relatively low-cost, high volume processes such as lithography and nanoimprinting. The magnetic recording layer material is then deposited over the entire surface of the pre-etched substrate to cover both the ends of the pillars and the trenches. The trenches are recessed far enough from the read/write head to not adversely affect reading or writing. This type of patterned media is described by Moritz et al., "Patterned Media Made From Pre-Etched Wafers: A Promising Route Toward Ultrahigh-Density Magnetic Recording", *IEEE Transactions on Magnetics*, Vol. 38, No. 4, July 2002, pp. 1731-1736.

In conventional magnetic recording where the data bits are written on continuous media, there is no requirement to write to precise positions on the media since all of the media contains magnetic material. However, with patterned media, because the data islands are single-domain, the transitions between bits may occur only between islands. Since the magnetic transitions are restricted to predetermined locations governed by the locations of individual islands, it is necessary to synchronize the reversal of current in the write head with the passing of individual islands under the head. Also to assure that the write head is precisely aligned with the islands on the patterned media, the media must be patterned perfectly with a single accurate period, and the effective motor speed of the spindle supporting the disks must be highly stable so that the write clock is perfectly synchronized with the islands as they pass beneath the write head. U.S. Pat. No. 6,754,017 B2, assigned to the same assignee as this application, describes a magnetic recording disk drive with patterned media that uses a special pattern-sensor that senses the data blocks before they pass beneath the write head and generates a write-clock signal.

What is needed is a magnetic recording disk drive with patterned media that has an accurate write-clock signal so that the data can be accurately written to the patterned data blocks.

SUMMARY OF THE INVENTION

The invention is a system and method for accurately clocking write data in a patterned media disk drive. The disk has concentric data tracks patterned into discrete magnetizable data blocks and equally angularly spaced timing marks that extend radially across the data tracks. The synchronization method times the intervals between successive timing marks to obtain the correct frequency for the write clock. The phase of the write clock is set by observing the time that the most recent timing mark has been detected. The timing marks may be servo timing marks (STMs) located within equally angularly spaced servo sectors that are used for positioning the read/write heads.

The disk drive has timing mark detection circuitry that receives timing mark signals from the read head as the disk rotates. The timing mark detection circuitry has a counter for counting the integer number of write clock cycles between successive timing marks and a phase detector for measuring the phase difference between a timing mark and a reference signal, with the phase difference representing a fractional part of a write clock cycle. The measured time between successive timing marks is compared to a nominal predetermined value and the difference is output as a timing error to a write clock compensator.

The compensator includes a state estimator that calculates timing parameters (phase, frequency and rate of change of frequency of the write clock) as part of its state estimation algorithm, and write clock control logic. The write clock control logic is a second order digital state machine with phase, frequency and rate-of-change of frequency registers for the timing parameters received from the state estimator. The parameters are loaded into shadow registers and the shadow registers values are latched into the parameter registers after a specified number of write clock cycles. Updates to the shadow registers are clocked off the write clock. Periodically the phase register is incremented by the value of the frequency register and the frequency register is updated by the value of the rate-of-change of frequency register.

The write clock may be a voltage-controlled oscillator (VCO) in a conventional phase-locked loop (PLL). The write clock is capable of generating equally spaced primary phases and phases intermediate the primary phases. The write clock control logic includes a phase rotator that controls which clock phase is selected for output. The value in the phase register of the write clock control logic is used to control the phase rotator to advance or retard the write clock phase, and thus to adjust its frequency and phase so as to be synchronized for writing to the data blocks.

A feedforward estimator may be input to the to the compensator to correct for repeatable disturbances to the write clock frequency caused primarily by eccentricity of the circular data tracks and repeatable runout in the spindle motor. By applying corrections for repeatable errors in a feedforward approach, the write clock synchronization method can be improved.

The invention may also include a method for error recovery if the data has not been properly written. Since the timing marks are located periodically around each track near the beginning of each data sector, it is possible to measure the phase error of the write clock after completion of writing a data sector. If the timing mark detection circuitry measures an error of more than a specific absolute fraction of a write clock cycle, then an error recovery procedure may be initiated to rewrite the data in that sector.

For a fuller understanding of the nature and advantages of the present invention, reference should be made to the following detailed description taken together with the accompanying figures.

DETAILED DESCRIPTION OF THE INVENTION

Figure 1A:
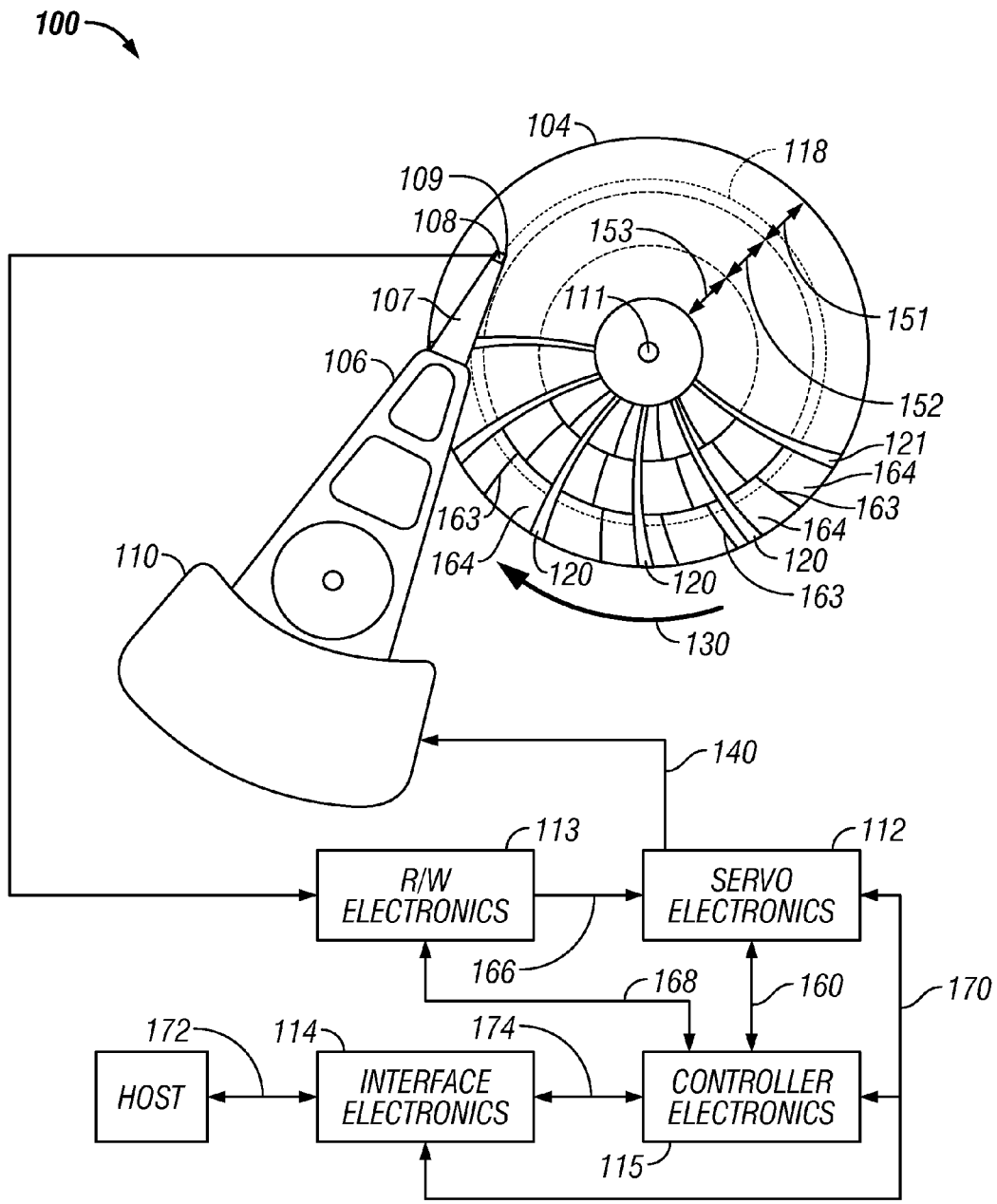
FIG. 1 is a schematic of a magnetic recording disk drive that may also be adapted for use with patterned media according to this invention.

FIG. 1 is a schematic of a conventional magnetic recording disk drive that may also be adapted for use with patterned media according to this invention. The disk drive, designated generally as 100, includes the magnetic recording disk 104, a rotary voice coil motor (VCM) actuator 110, an actuator arm 106, a suspension 107, a head carrier or air-bearing slider 108 and a recording head 109. The recording head 109 is typically a combination of an inductive write head with a magnetoresistive read head (also called a read/write head) and is located on the trailing end or end face of a head carrier or slider 108. Slider 108 is supported on the actuator arm 106 by a suspension 107 that enables the slider to "pitch" and "roll" on an air-bearing generated by the disk 104 as it rotates in the direction of arrow 130. Only one disk surface with associated slider and recording head is shown in FIG. 1, but there are typically multiple disks stacked on a hub that is rotated by a spindle motor, with a separate slider and recording head associated with each surface of each disk.

The disk 104 has a center of rotation 111 and is rotated in direction 130. The disk 104 has radially-spaced concentric data tracks, one of which is shown as track 118. Each data track has a reference index 121 indicating the start-of-track. The disk drive is illustrated as a zone-bit-recording (ZBR) disk drive because the data tracks are grouped radially into a number of annular data bands or zones, three of which are shown as zones 151, 152 and 153, but the invention is fully applicable to a disk drive that does not use ZBR, in which case the disk drive would have only a single data zone. Within each zone, the tracks are also circumferentially divided into a number of data sectors, such as typical data sectors 164 in the radially outer data zone. Each data sector 164 is preceded by a synchronization (sync) field, such as typical sync fields 163. The sync fields 163 are detectable by the read head for enabling synchronization of reading and writing the data bits in the data sectors 164. A sync field 163 is a nondata region on the disk that is magnetized each time data is written in its associated data sector 164.

Each data track also includes a plurality of circumferentially or angularly-spaced servo sectors 120 that contain positioning information detectable by the read head for moving the head 109 to desired data tracks and maintaining the head 109 on the data tracks. The servo sectors in each track are aligned circumferentially with the servo sectors in the other tracks so that they extend across the tracks in a generally radial direction, as represented by radially-directed servo sectors 120. The servo sectors 120 are nondata regions on the disk that are magnetized once, typically during manufacturing or formatting of the disk, and are not intended to be erased during normal operation of the disk drive.

The electronics associated with disk drive 100 include read/write (R/W) electronics 113, servo electronics 112, controller electronics 115 and interface electronics 114. In the operation of disk drive 100, the R/W electronics 113 receives signals from head 109 and passes servo information from the servo sectors 120 to servo electronics 112 and data signals from the data sectors 164 to controller electronics 115. Servo electronics 112 typically includes a servo control processor that uses the servo information from the servo sectors 120 to run a control algorithm that produces a control signal. The control signal is converted to a current at 140 that drives VCM actuator 110 to position the head 109. Interface electronics 114 communicates with a host system (not shown) over interface 172, passing data and command information. Interface electronics 114 also communicates with controller electronics 115 over interface 174. In the operation of disk drive 100, interface electronics 114 receives a request from the host system, such as a personal computer (PC), for reading from or writing to the data sectors 164 over interface 172. Controller electronics 115 receives a list of requested data sectors from interface electronics 114 and converts them into a set of numbers that uniquely identify the disk surface, track and data sector. The numbers are passed to servo electronics 112 to enable positioning head 109 to the appropriate data sector.

If the disk drive is a "headerless" architecture disk drive, meaning that the data sectors 164 do not contain unique data sector addresses that are required to be read before data can be read from or written to the data sectors, then once the servo electronics 112 has positioned head 109 over the appropriate data track, servo electronics 112 begins executing sector computations to locate and identify the desired data sector. In brief, in the headerless architecture approach, a servo timing mark (STM) at the beginning of the servo sectors 120 is used to locate servo sectors, and a count of STMs from a servo sector containing an index mark 121 uniquely identifies each servo sector. Once the desired data sector is thus identified, the sync field preceding that data sector is detected to control the timing of data bits read from the data sector or data bits written to the data sector.

Conventional magnetic recording disk drives use disks with "continuous" media, meaning that the magnetic recording layer is a continuous film of magnetizable material. In conventional continuous-media disks the concentric data tracks are not physically separated from one another and are not pre-formed in the recording layer, but are formed when the write fields from the write head create the magnetizations in the continuous magnetic layer.

However, magnetic recording disks with "patterned" media have been proposed to increase the data density. In patterned media, the magnetizable material on the disk is patterned into small isolated islands or blocks. To produce the required magnetic isolation of the patterned islands, the magnetic moment of the regions or spaces between the islands must be destroyed or substantially reduced so as to render these spaces essentially nonmagnetic. In one type of patterned media, the islands are elevated regions or pillars that extend above the spaces and magnetic material covers both the islands and the spaces, but the spaces are far enough from the read/write head to not adversely affect reading or writing, so the spaces can be considered essentially nonmagnetic. Alternatively, the media may be fabricated so that there is no magnetic material in the spaces between the islands. In patterned media, the data sectors as well as the nondata regions, including the servo sectors, are patterned.

Figure 2:
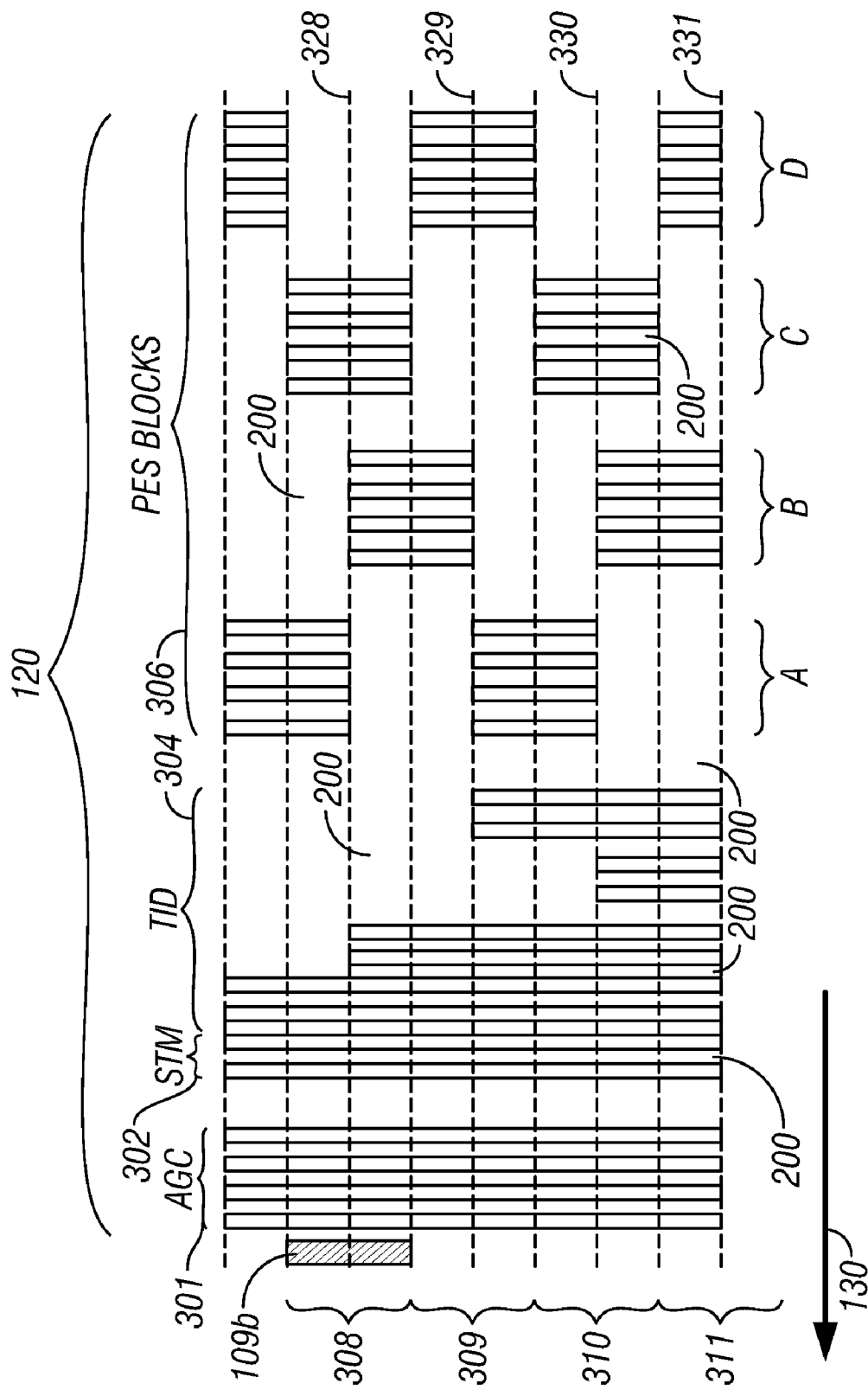
FIG. 2 is an illustration of a portion of a patterned-media disk with a typical patterned servo sector spanning several data tracks.

FIG. 2 is a schematic showing a portion of a patterned-media disk with a typical patterned servo sector 120 spanning several data tracks. Three full data tracks and one half-track are depicted: 308, 309, 310 and half-track 311, each having a respective track centerline 328, 329, 330 and 331. The read head 109a is shown as positioned in data track 308 and will detect the islands in servo sector 120 as the disk rotates in the direction of arrow 130.

The servo sector 120 is a conventional servo pattern of the type commonly used in sector servo systems and shows a greatly simplified pattern for clarity. The servo pattern includes several fields containing nondata islands, which are shown as automatic gain control (AGC) field 301, servo-timing-mark (STM) field 302, track ID (TID) field 304 and position-error-signal (PES) field 306. PES field 306 is depicted as the well-known quadrature pattern of PES islands A-D. The PES islands A-D are used to determine the fractional part of the radial position of the head. When the head is at the track centers the read-back signal amplitudes from the A islands and the B islands are equal. When the head is at the half-track positions the amplitudes from the C islands and the D islands are equal. As the head moves off-track the amplitudes from all the islands will increase or decrease. The amplitudes of the PES islands are decoded in servo electronics 112 and used in the control algorithm run by the servo control processor to generate control singles to the VCM 110 to reposition the head.

In FIG. 2 all of the islands in servo sector 120 are discrete blocks or islands of magnetic material and are magnetized in the same direction, either perpendicular to the recording layer (either into or out of the paper in FIG. 2) for perpendicular-recording media, or in the plane of the recording layer (either to the right or left in the along-the-track direction in FIG. 2) for horizontal-recording media. The islands are typically DC-magnetized by a large magnet during manufacturing. Each discrete island is a magnetized island separated from other islands by nonmagnetic regions or spaces represented as 200. The term "nonmagnetic" means that the spaces 200 between the islands are formed of a nonferromagnetic material, such as a dielectric, or a material that has no substantial remanent moment in the absence of an applied magnetic field, or a magnetic material in a groove or trench recessed far enough below the islands to not adversely affect reading or writing. The nonmagnetic spaces 200 may also be the absence of magnetic material, such as grooves or troughs in the magnetic recording layer or disk substrate.

Figure 3:
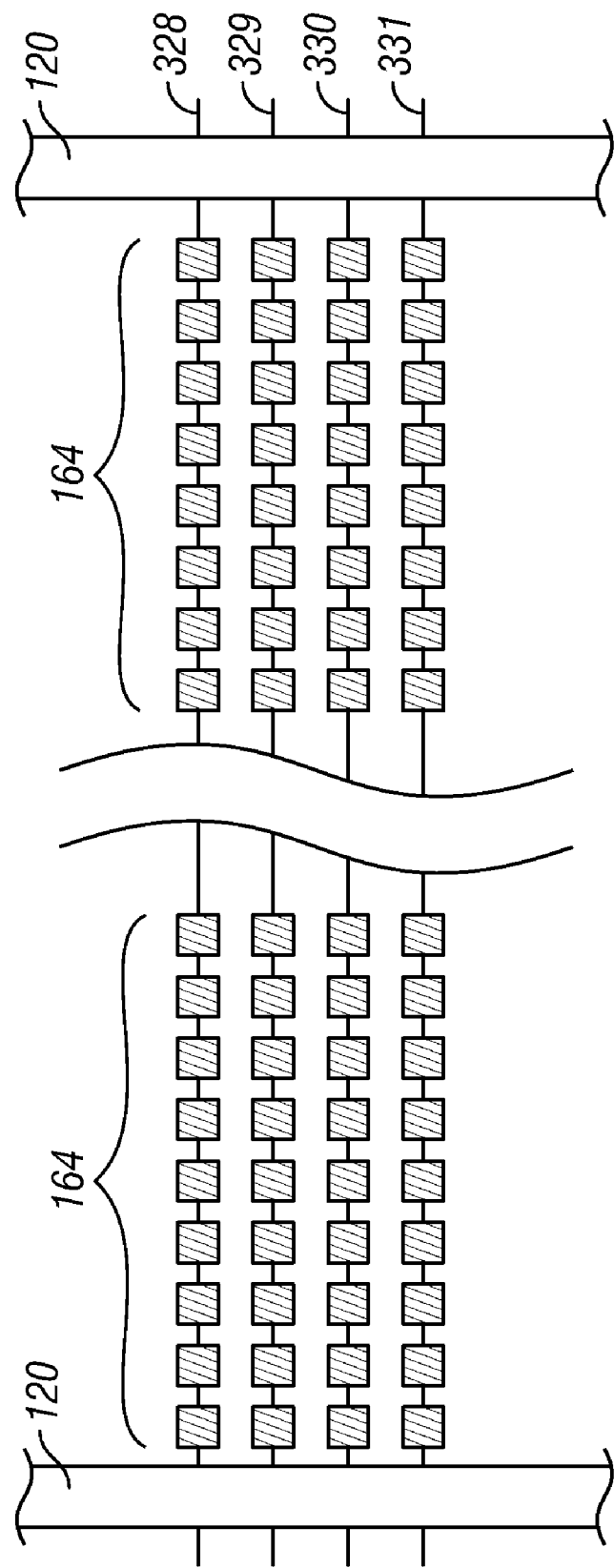
FIG. 3 is an illustration of a patterned-media disk with portions of data sectors of discrete data blocks between two successive servo sectors.

FIG. 3 is a schematic illustration of portions of data sectors 164 between two successive servo sectors 120 and showing four typical data tracks with centerlines 328, 329, 330, 331. Like the islands in servo sector 120 (FIG. 2), each data track contains discrete spaced-apart blocks or islands of magnetic material that are separated from other islands by nonmagnetic regions or spaces.

Figure 4:
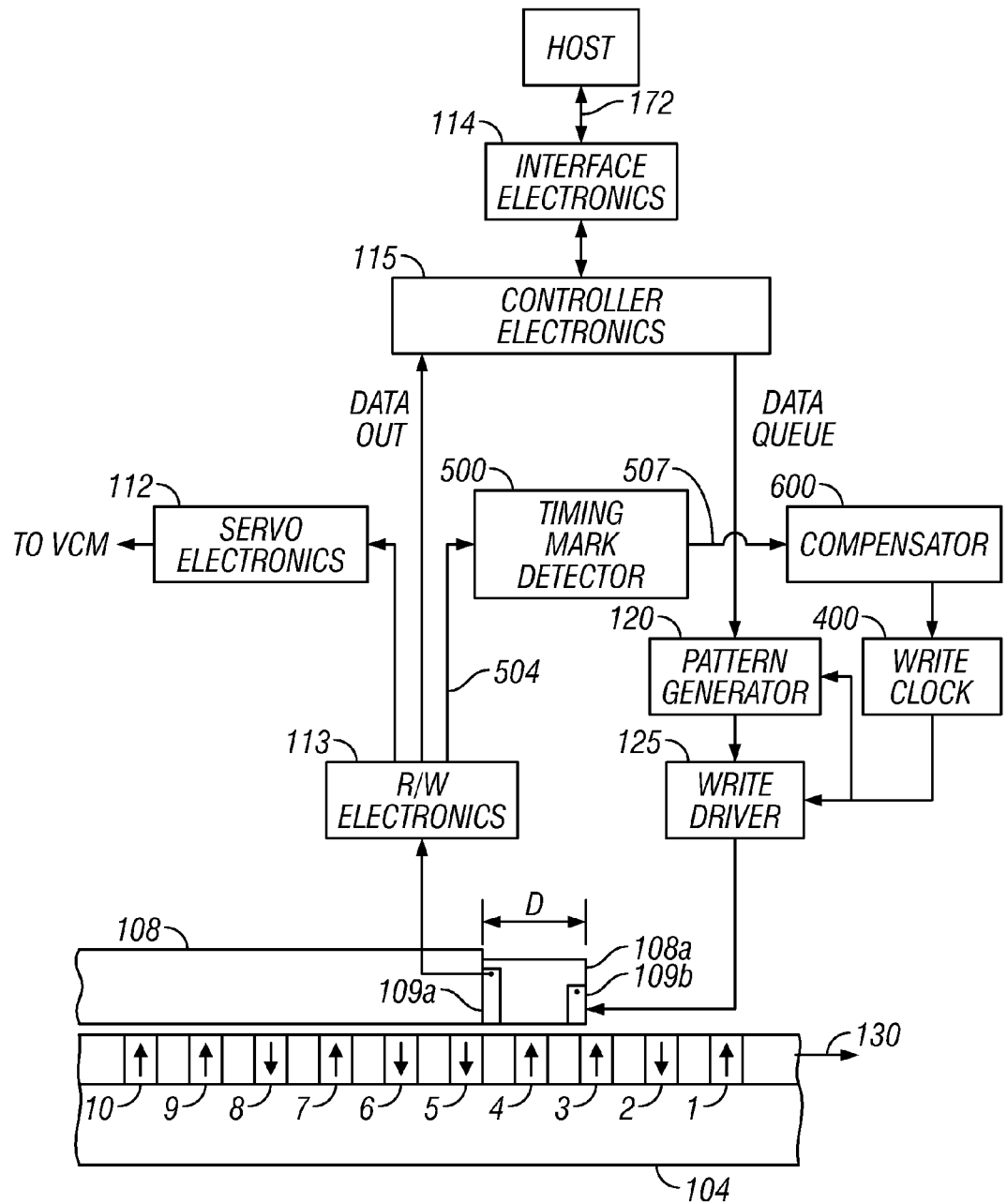
FIG. 4 is a sectional view of a magnetic recording disk with discrete magnetizable data blocks and illustrates the transfer of data between a host system and the disk drive.

FIG. 4 shows a sectional view of the magnetic recording disk 104 with a magnetic recording layer of patterned media in the form of discrete magnetizable data blocks 1-10. The air-bearing slider 108 is depicted in sectional view above disk 104 and is shown with the read head 109a and the write head 109b. The read head 109a and write head 109b are formed on the trailing end 108a of slider 108 with a physical spacing distance D between them. The arrows depicted in the blocks 1-10 represent the magnetic moments or magnetization directions in the blocks, and are depicted for perpendicular or out-of-plane magnetic recording. The recording or writing of data occurs by an inductive coil write head 109b that has a write pole that generates a magnetic field to magnetize the blocks in one of the two magnetization directions, depending on the direction of current through the coil of the write head. Because there is no magnetic material between the blocks 1-10, the write pulses must be precisely timed to magnetize the appropriate blocks. While FIG. 4 illustrates perpendicular patterned media, wherein the blocks 1-10 are depicted with their moments oriented out of the plane of the recording layer, the invention is fully applicable to horizontal or longitudinal patterned media, wherein the blocks 1-10 would have their moments oriented in the plane of the magnetic recording layer.

FIG. 4 also shows schematically the transfer of data between a host system, such as a PC, and the disk drive. The signals from recorded data blocks in the data sectors 164 and from the nondata islands in the servo sectors 120 are detected by read head 109a, and amplified and decoded by read/write electronics 113. Data is sent to controller electronics 115 and through interface electronics 114 to the host via interface 172. Servo information from the servo fields (FIG. 2) is sent to servo electronics 112. Servo electronics 112 decodes the servo information and generates control signals to the VCM 110. The servo electronics 112 includes a STM decoder that generates the STM signal, also called the servo ID or (SID) signal, that indicates the start of a servo sector 120. The data to be written to the disk 104 is sent from the host to interface electronics 114 and controller electronics 115 and then as a data queue to pattern generator 120 and then to write driver 125. The write driver 125 generates high-frequency current pulses to the coil of write head 109b which results in the magnetic write fields that magnetize the data blocks 1-10. The pattern generator 120 and write driver 125 are controlled by write clock 400.

In this invention, the write clock is synchronized with the location of the data blocks so that the write pulses magnetize the desired data blocks and only the desired data blocks. If the only items between successive STMs were a particular number of data blocks, then the write clock is properly synchronized if it produces one clock cycle per data block. The synchronization method uses periodic timing marks that are located around the data tracks, and times the intervals between successive marks to obtain the correct frequency for the write clock. The timing marks are preferably located in the servo sectors, and may be the STMs, but the timing marks may also be separate dedicated nondata islands angularly spaced around the disk. The phase of the write clock is set by observing the time that the most recent mark has been detected. The clock used for timing the intervals is preferably the write clock itself, whose frequency and phase are being controlled, or a dedicated fixed-frequency clock separate from the write clock. Determination of the correct write clock frequency may be based on the recent history of interval times measured. As shown in FIG. 4, a timing mark detector 500 receives the readback signal from R/W electronics on input line 504 and outputs a timing error signal on line 507 to compensator 600 that adjusts the phase and frequency of write clock 400 to synchronize the write pulses to pattern generator 120 and write driver 125. In the embodiment described herein the timing mark detector detects the STM in the readback signal from R/W electronics 113. Alternatively, the STM signal may be decoded by the servo electronics 112 and input to timing mark detector 500.

Figure 5:
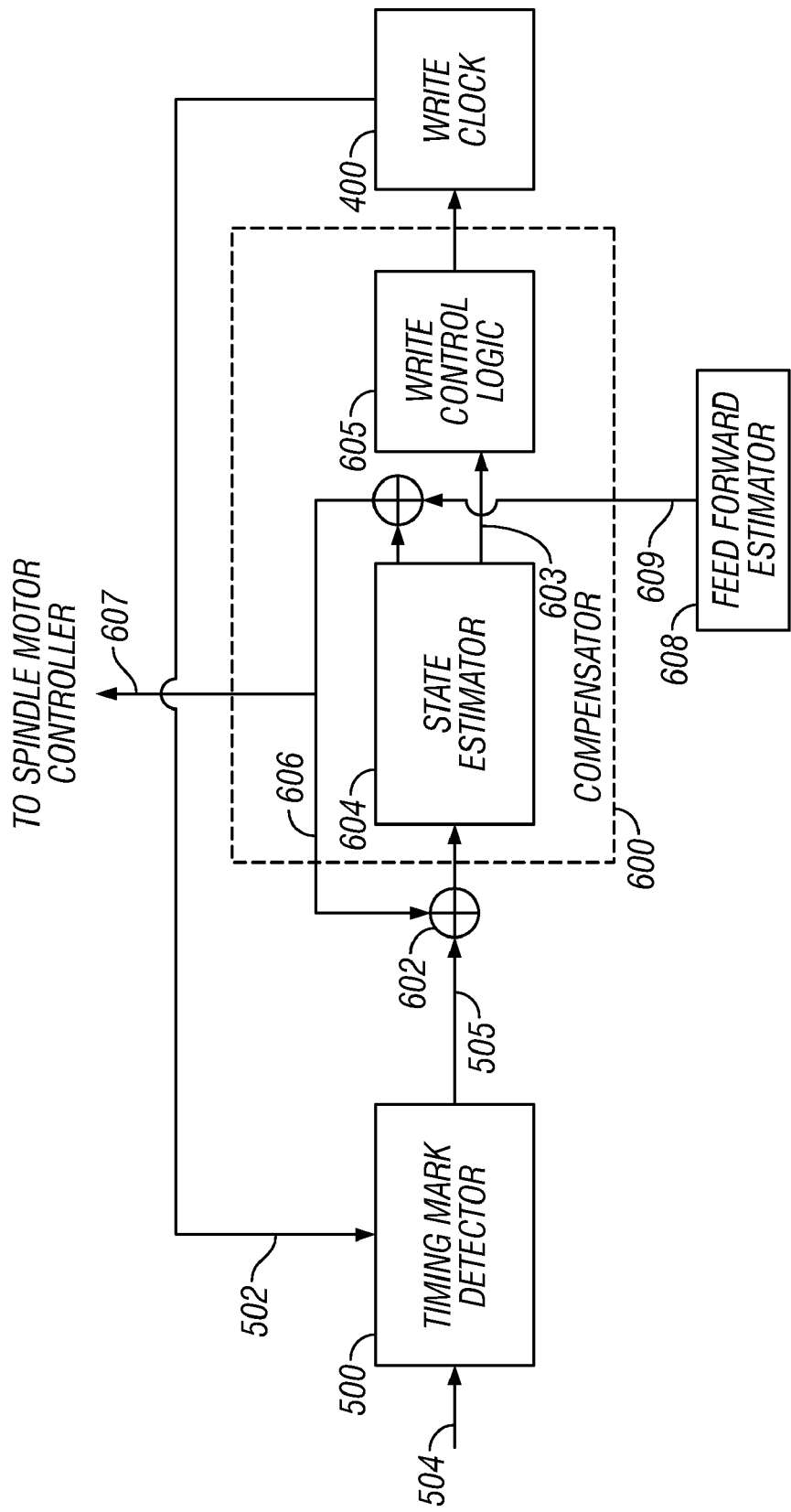
FIG. 5 is a block diagram of the write synchronization system.

FIG. 5 is a more detailed block diagram of the synchronization system. The timing mark detector 500 receives the output from write clock 400 on line 502 and includes a counter that is triggered by receipt of a STM input on line 504. The counter counts the number of write clock cycles that occur in the interval between successive STMs to determine an integer value of timing error (i.e., an integer number of write clock cycles by which the write clock is in error). The timing mark detector 500 also includes a phase detector for determining the phase error of the write clock between successive STMs, which corresponds to a fractional part of a clock cycle. A gross timing error is then output on line 505 to summing junction 602. Also shown in FIG. 5 is that the output on line 505 provides a correction signal to the spindle motor controller (not shown). The spindle motor controller uses a fixed-frequency clock (not shown) to make absolute measurements of spindle speed and control the spindle speed. The correction signal on line 505 may be used to further control the spindle motor speed.

The compensator 600 includes a state estimator 604 in a feedback control loop and write clock control logic 605. The state estimator 604 is a standard control system element in which the dynamics of the system are expressed as a system of state equations. The state of the system is represented as a vector of real numbers and the estimate for the current state is calculated from the estimated state from the previous time sample (shown as the input on line 606 to summing junction 602) and the current measurement, in this case the measured timing error output from timing mark detector 504 at line 505 and input to summing junction 602. The basic state estimator is a Kalman filter. The state estimator 604 also calculates timing parameters as part of its state estimation algorithm. These parameters are values of phase, frequency and rate of change of frequency of the write clock, and are output on line 603 to write clock control logic 605.

Also shown in FIG. 5 is a feedforward estimator 608 that provides an input on line 609 to the compensator 600 feedback control loop. Disturbances to the write clock frequency include repeatable "runout" that is primarily due to eccentricity of the circular data tracks with the actual center of rotation of the spindle motor. Such eccentricity is difficult to avoid in patterned media disk drives because there is finite accuracy in centering the tracks during the patterning of the disk. Also, there is repeatable runout in the spindle bearings and the mounting of the disk on the spindle introduces additional runout. By keeping a history of write clock frequency error during multiple disk rotations, the system can determine repeatable error components. For example, the measured timing error for different angular positions on the disk (e.g., different servo sectors) can be stored for different tracks or zones. These values can be recalled, or the stored values can be curve fit and the timing error calculated from the servo sector number, and fed forward into the compensator 600. By applying corrections for such repeatable errors in a feedforward approach, the write synchronization method can be improved.

Figure 6:
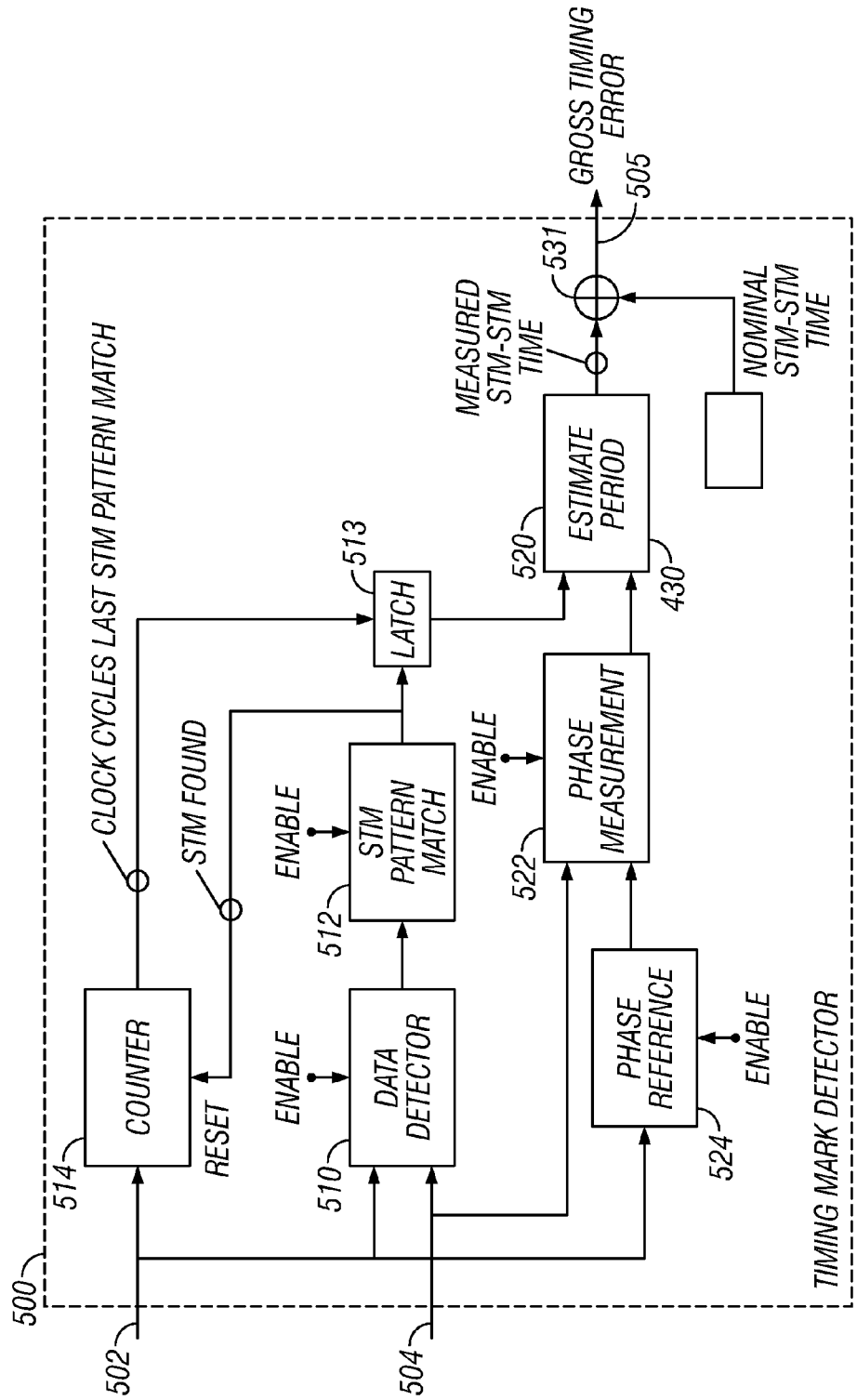
FIG. 6 is a detailed bock diagram of the timing mark detector portion of the write synchronization system.

FIG. 6 is a detailed bock diagram of the timing mark detector 500. The readback signal is input at line 504 to a data detector 510 and sent to STM pattern match block 512. When a STM is found, latch 513 is closed and the counter 514 is reset and begins counting write clock cycles that are input to counter 514 on line 502 from the write clock 400 (FIG. 5). When the next STM is found, the latch 513 is opened and the contents of counter 514 are sent to the estimate period block 520. This count value corresponds to the integer number of write clock cycles detected between the two STMs.

Figure 7:
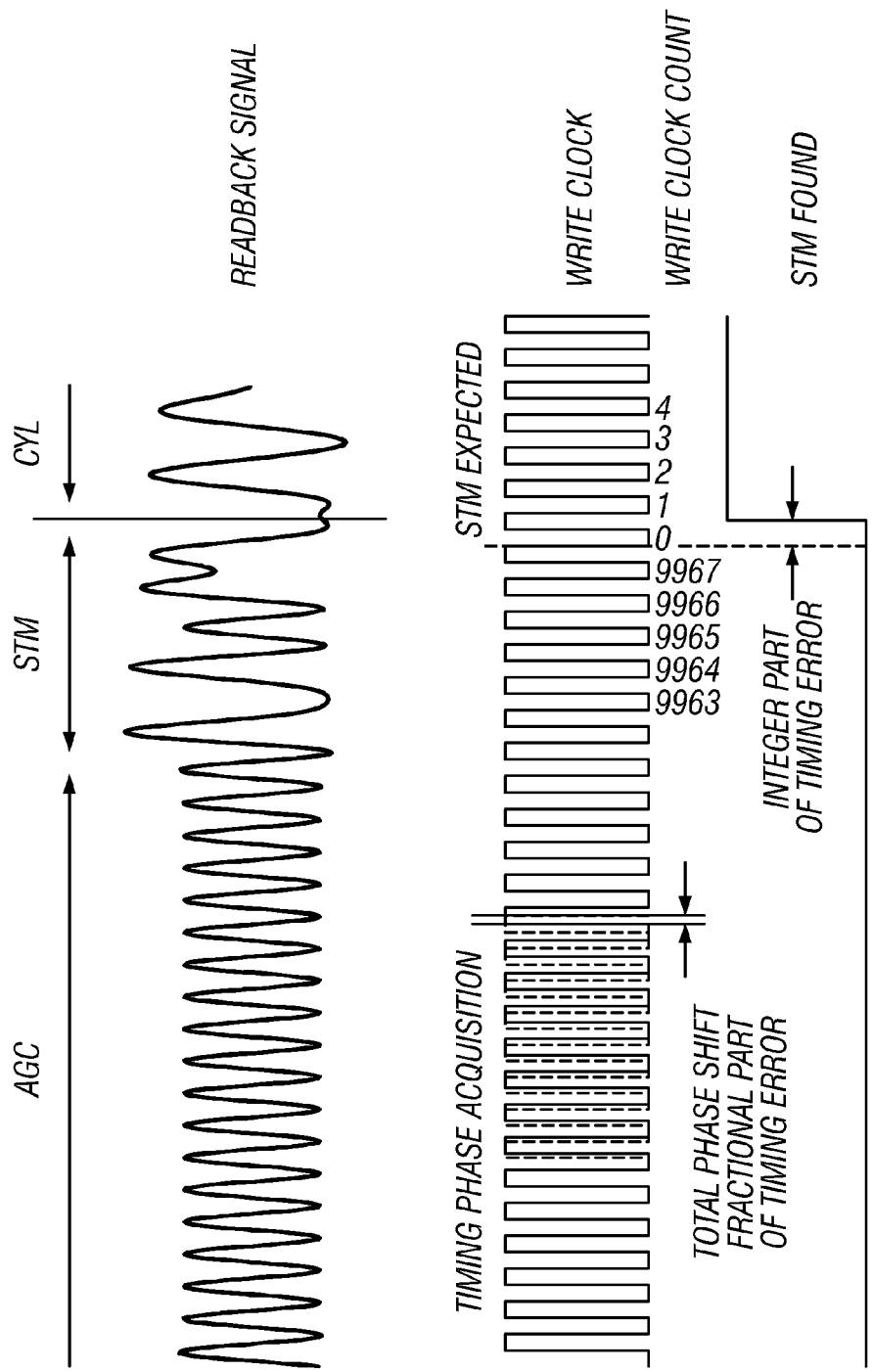
FIG. 7 is a graphical illustration of the method for determining the timing error in the interval between successive servo timing marks (STMs).

The timing mark detector 500 also measures the fractional part of write clock cycles in the interval between two STMs. This is shown by phase measurement block 522. In this method both the servo AGC field (301 in FIG. 2) and STM field (304 in FIG. 2) may be taken together as the timing mark. The first harmonic of the AGC field readback signal is input to phase measurement block 522. A phase reference block 524 receives the write clock input on line 502 and generates a reference sine wave which is input to phase measurement block 522. The fractional part of the write clock cycles is found by measuring the phase difference between the first harmonic of the AGC field readback signal and the reference sine wave. In the simplest case, where the servo AGC field frequency is the same as the write clock frequency this reduces to simply measuring the phase difference between the servo AGC field signal and the write clock. This easiest way to measure this phase difference is by adjusting the phase of the write clock to match the phase of the servo AGC field while simultaneously recording the total phase shift applied. This is a standard process known as phase acquisition. The output from phase measurement block 522 is then summed with the output of counter 514 in the estimate period block 520, whose output is the precise measured time interval between successive STMs. Then, at summing junction 531 the difference between this value and the nominal STM-to-STM time interval is the gross timing error that is output on line 505. The above-described method for determining the timing error in STM-to-STM time interval is depicted graphically in FIG. 7.

Figure 8:
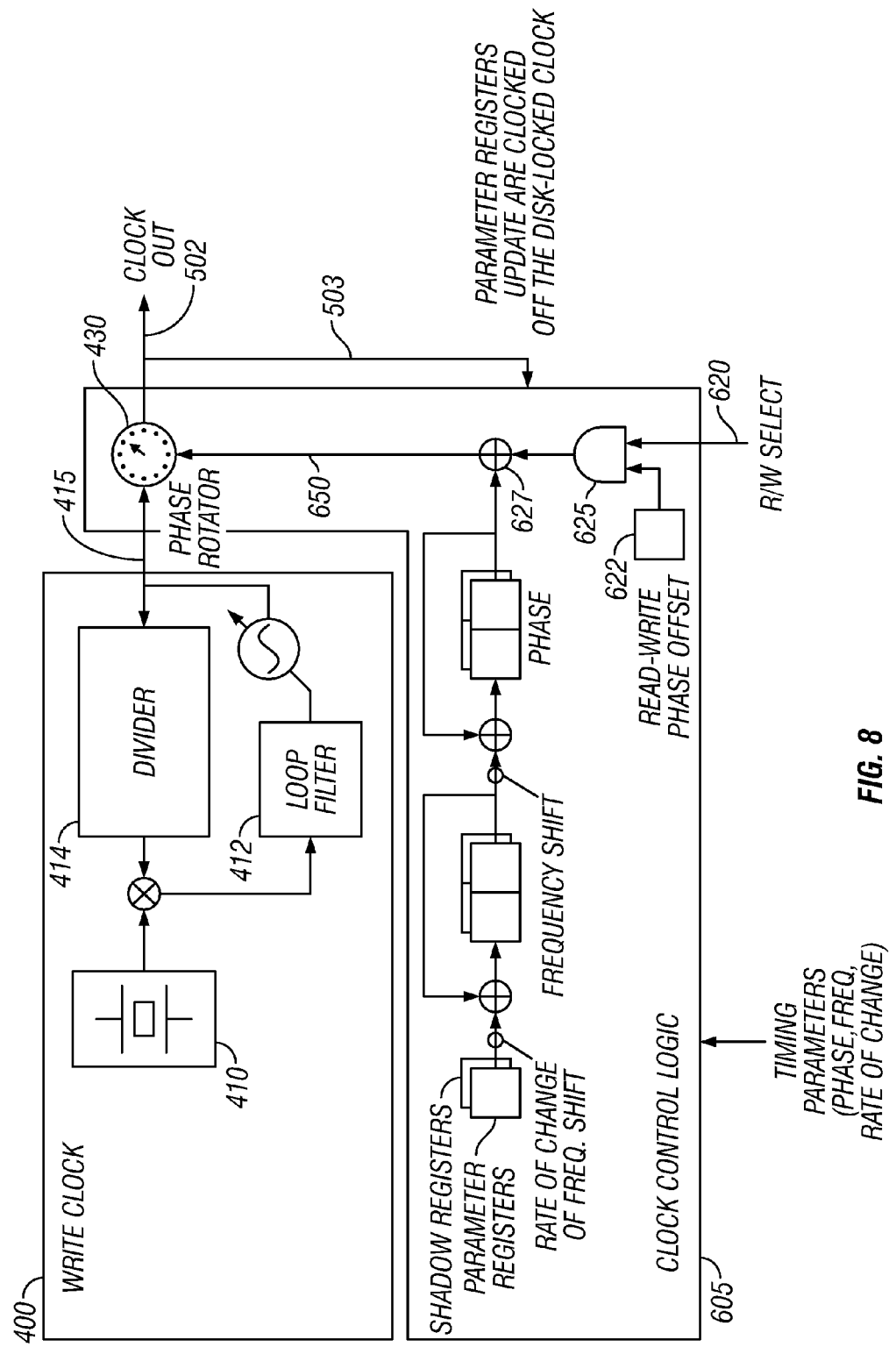
FIG. 8 is a block diagram of the write clock control logic and the write clock portions of the write synchronization system.

FIG. 8 is a detailed block diagram of the write clock control logic 605 and the write clock 400. The write clock 400 may be a voltage-controlled oscillator (VCO) in a conventional phase-locked loop (PLL) with a crystal reference 410 and loop filter 412. The divider 414 allows the write clock frequency to be adjusted, for example in multiples of 1/16th of the frequency of the crystal reference 410. This enables the PLL output 415 to be set to different output frequencies depending on the frequency of the data zone. The settings in divider 414 should be selected so the PLL output is as close as possible to the desired write clock frequency to minimize the average size of phase updates at phase rotator 430. The write clock signal is generated in equally spaced primary phases, and by analog interpolation it is possible to generate clocks with a phase intermediate the primary phases. For example, the clock output at line 415 may be capable of 64 equally spaced clock phases. A phase rotator 430, also called a "mixer", controls which clock phase is selected for output on line 502.

The clock control logic 605 outputs a control signal on line 650 to phase rotator 430 to advance or retard the clock phase, and thus to adjust its frequency and phase so as to be synchronized for writing to the data blocks.

The clock control logic 605 is activated during writing by R/W select line 620 to gate 625. The clock control logic 605 is a second order digital state machine with phase, frequency and rate-of-change of frequency registers for the timing parameters received from state estimator 604. The parameters are loaded into shadow registers and the shadow registers values are latched into the parameter registers after a specified number of write clock cycles. Updates to the shadow registers are clocked off the write clock input at line 503. Periodically the phase register is incremented by the value of the frequency register and the frequency register is updated by the value of the rate-of-change of frequency register. When the phase register exceeds a threshold equal to half the smallest step size of the phase rotator 430, it is output to junction 627 for incrementing the phase rotator at line 650. The phase register is then decremented by the phase rotator step-size. Similarly an underflow causes the phase rotator to decrement.

Also shown in FIG. 8 is an adjustment for read head-write offset, shown as block 622. Since there is a physical offset between the read head and write head, as shown by spacing D in FIG. 4, a phase offset is also needed to be summed at junction 627 with the output from the phase register. Since the physical offset between the read and write heads may be unique to each head, and is typically also a function of actuator skew and thus the specific track on which the heads are located, a calculation must be performed or a lookup table used to generate the correct phase offset for a particular head and track on which data is to be written.

Figure 9:
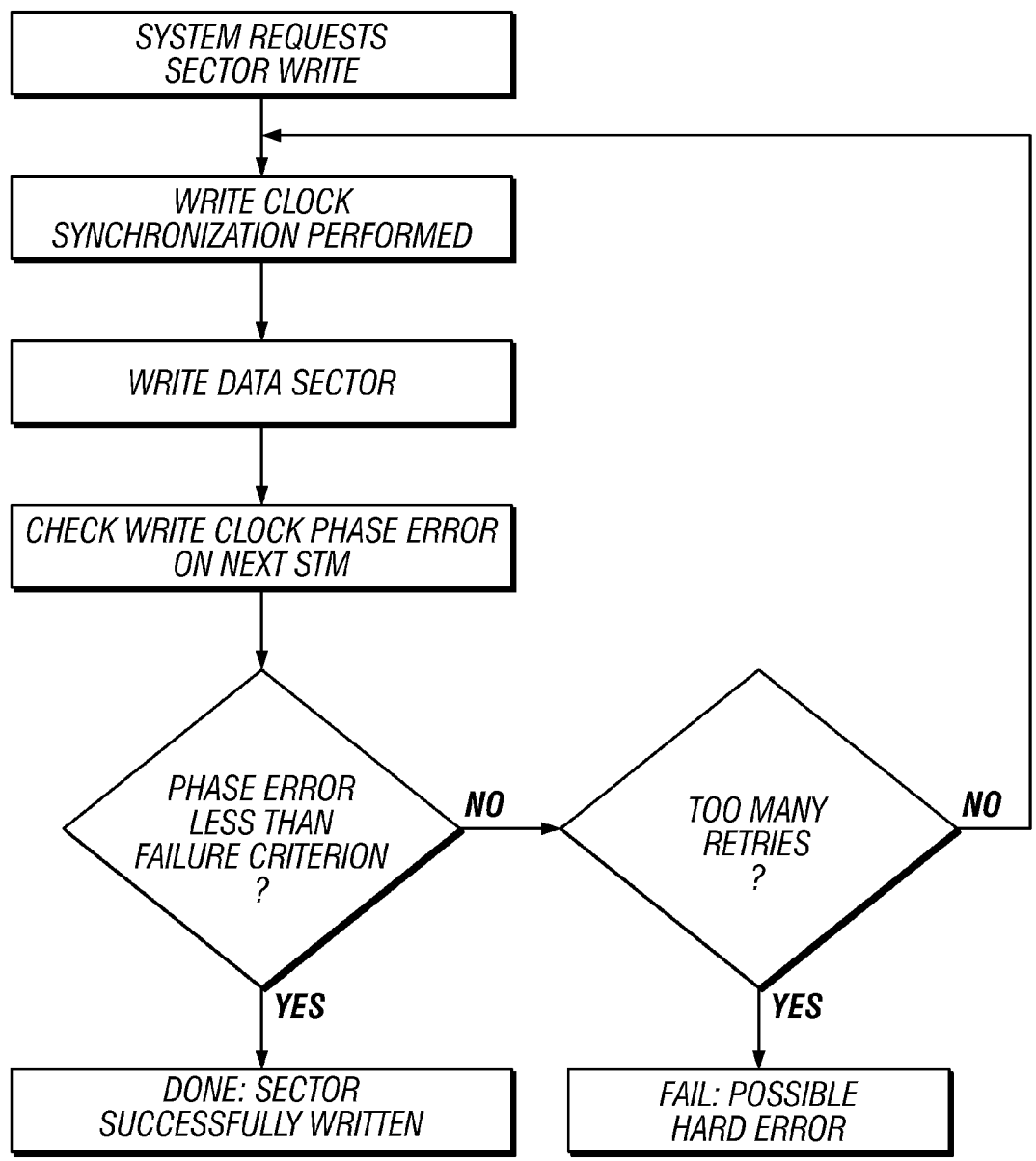
FIG. 9 is a block diagram of an error recovery procedure if there is a write error.

In this invention, after data has been written to the data blocks using the write synchronization method described above, it may be desirable to check if the data has been properly written and perform an error recovery procedure if necessary. Since the STMs or other timing marks are located periodically around each track near the beginning of each data sector, it is possible to measure the phase error of the write clock after completion of writing a data sector. If the timing mark detector 500 measures an error of more than a specific absolute fraction of a write clock cycle, for example a typical failure criterion might be 15% of a write clock cycle, then an error recovery procedure may be initiated to rewrite the data in that sector. If on the second try, writing takes place and an acceptably small phase error is measured, the recovery procedure is complete. If phase error is again too large, the process can be repeated until a small enough phase error is measured, or a maximum trial number is reached and a "hard error" event may be declared. The hard error event may trigger other error recovery procedures, such as reassigning the data from that sector to another location on the disk. A block diagram of an error recovery procedure is shown in FIG. 9.

The write synchronization system and method as described above and illustrated with various block diagrams may be implemented in conventional analog or digital hardware components or in software. The servo control processor, or other microprocessor in the disk drive, may perform the method, or portions of the method, using algorithms implemented in computer programs stored in memory accessible to the processor.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
   a rotatable magnetic recording disk having a plurality of generally circular data tracks, each data track patterned into discrete magnetizable data blocks, and a plurality of generally equally angularly spaced servo sectors extending generally radially across the data tracks and containing timing marks, the timing marks comprising servo timing marks (STMs) and automatic gain control (AGC) marks;
   a write head for generating write pulses to magnetize the discrete data blocks;
   a write clock coupled to the write head for controlling the write pulses to the discrete data blocks;
   a read head for sensing the timing marks;
   timing mark detection circuitry coupled to the read head for measuring a write clock timing error between successive timing marks during rotation of the disk and comprising a phase detector for measuring the phase difference between the signal from the AGC marks and a reference signal, said reference signal being derived from the write clock, said phase difference representing a fractional part of a write clock cycle; and
   timing error compensation circuitry responsive to the timing error for adjusting the write clock.

2. The disk drive of claim 1 wherein the timing mark detection circuitry comprises a counter for counting an integer number of write clock cycles between successive STMs.

3. The disk drive of claim 1 wherein the timing error compensation circuitry comprises a state estimator for generating, from the timing error, timing parameters representing the estimated write clock phase, frequency and rate of change of frequency.

4. The disk drive of claim 1 wherein the write clock has adjustable phases and the timing error compensation circuitry comprises a phase error register, and wherein the phase of the write clock is adjusted by the value in said phase register.

5. The disk drive of claim 1 wherein the read head and write head are physically offset from each other, and further comprising means for adjusting the write clock by a value representative of said offset.

6. The disk drive of claim 1 wherein the data tracks are grouped into a plurality of radially spaced bands, and wherein the write clock frequency is unique for each of the bands.

7. The disk drive of claim 1 wherein the timing error compensation circuitry comprises means for storing a plurality of measured timing errors and associated timing marks during a plurality of disk rotations, said stored timing errors being representative of timing errors generally repeatable with disk rotation.

8. The disk drive of claim 7 further comprising means for adjusting the write clock with said stored repeatable timing errors.

9. A method for synchronizing the writing of data on discrete magnetizable data blocks of a patterned media disk drive, the disk drive having (a) a rotatable magnetic recording disk having a plurality of generally circular data tracks, each data track patterned into discrete magnetizable data blocks, and a plurality of generally equally angularly spaced timing marks extending generally radially across the data tracks; (b) a write head for generating write pulses to magnetize the discrete data blocks; (c) a write clock coupled to the write head for controlling the write pulses to the discrete data blocks; (d) a read head for sensing the timing marks; (e) a processor for receiving timing mark signals from the read head and generating timing compensation signals to the write clock; and (f) memory coupled to the processor and containing a program of instructions readable by the processor; the processor-implemented method comprising:

measuring the time between successive timing mark signals by counting an integer number of write clock cycles between successive timing marks and by measuring the phase difference between a timing mark and a reference signal derived from the write clock, said phase difference representing a fractional part of a write clock cycle;

calculating a timing error from the measured time and a predetermined time value;

adjusting the timing of the write clock in response to the calculated timing error; and after adjusting the timing of the write clock in response to the calculated timing error, writing data to a sector of data blocks, re-measuring the phase difference between a timing mark and a reference signal derived from the write clock, and re-writing data to said sector if the re-measured phase difference is greater than a predetermined value.

10. The method of claim 9 wherein the program of instructions includes a state estimator for enabling the processor to calculate, from the timing error, the estimated phase, frequency and rate of change of frequency of the write clock.

11. The method of claim 9 wherein the write clock has adjustable phases and wherein adjusting the timing of the write clock comprises adjusting the phase of the write clock.

12. The method of claim 9 wherein the read head and write head are physically offset from each other, and further comprising adjusting the write clock by a value representative of said offset.

13. The method of claim 9 wherein the disk has generally equally angularly spaced servo sectors extending generally radially across the data tracks and containing positioning information for positioning the read head and write head on the data tracks, and wherein the timing marks comprise servo timing marks (STMs) located within the servo sectors.

14. The method of claim 13 wherein the timing marks further comprise automatic gain control (AGC) marks located within the servo sectors, and wherein measuring the phase difference between a timing mark and a reference signal derived from the write clock comprises measuring the phase difference between the signal from the AGC marks and a reference signal derived from the write clock.

15. The method of claim 9 wherein the data tracks are grouped into a plurality of radially spaced bands, wherein the write clock frequency is unique for each of the bands, and wherein the method steps of measuring, calculating and adjusting are performed in each of said bands.

* * * * *